United States Patent
Kim et al.

(10) Patent No.: US 12,090,982 B2
(45) Date of Patent: Sep. 17, 2024

(54) BRAKING CONTROL DEVICE AND METHOD FOR MOTOR DRIVEN VEHICLE

(71) Applicant: HYUNDAI MOBIS Co., Ltd., Seoul (KR)

(72) Inventors: Minhoo Kim, Gwangmyeong-si (KR); Seo yun Han, Suwon-si (KR)

(73) Assignee: HYUNDAI MOBIS CO., LTD., Seoul (KR)

( * ) Notice: Subject to any disclaimer, the term of this patent is extended or adjusted under 35 U.S.C. 154(b) by 221 days.

(21) Appl. No.: 17/887,971

(22) Filed: Aug. 15, 2022

(65) Prior Publication Data

US 2023/0059219 A1 Feb. 23, 2023

(30) Foreign Application Priority Data

Aug. 20, 2021 (KR) .......................... 10-2021-0110477

(51) Int. Cl.
*B60T 8/173* (2006.01)
*B60T 8/172* (2006.01)
*B60T 8/1761* (2006.01)

(52) U.S. Cl.
CPC ............. *B60T 8/173* (2013.01); *B60T 8/172* (2013.01); *B60T 8/17616* (2013.01); *B60T 2260/04* (2013.01); *B60T 2270/413* (2013.01)

(58) Field of Classification Search
CPC ...... B60T 8/173; B60T 8/172; B60T 8/17616; B60T 2260/04; B60T 2270/413; B60T 2270/416

USPC .......................................................... 701/71
See application file for complete search history.

(56) References Cited

U.S. PATENT DOCUMENTS 5,116,109 A * 5/1992 Kuwana .................. B60T 8/348
188/181 C

FOREIGN PATENT DOCUMENTS

| EP | 1055575 | * | 11/2000 |
| JP | 3649036 B2 | * | 5/2005 |
| KR | 2006-012681 | * | 12/2006 |
| KR | 10-2020-0002476 A | | 1/2020 |
| KR | 10-2021-0022198 A | | 3/2021 |

* cited by examiner

*Primary Examiner* — Muhammad Shafi
(74) *Attorney, Agent, or Firm* — Morgan, Lewis & Bockius LLP

(57) ABSTRACT

A braking control device for a motor driven vehicle includes a wheel rotation speed sensing part which is disposed on each wheel of the vehicle and detects a detection speed of wheel rotation of the vehicle, a wheel rotation speed estimation part which detects a resolver value of a motor and estimates an estimation speed of wheel rotation using the detected resolver value, a sensor determination part which determines whether the wheel rotation speed sensing part is abnormal using the detection speed of wheel rotation and the estimation speed of wheel rotation, and a wheel rotation speed determination part which determines the estimated estimation speed of wheel rotation to be a wheel rotation speed of the vehicle when the wheel rotation speed sensing part is abnormal.

8 Claims, 3 Drawing Sheets

BRAKING CONTROL DEVICE AND METHOD FOR MOTOR DRIVEN VEHICLE

CROSS-REFERENCE TO RELATED APPLICATION

This application claims priority to and the benefit of Korean Patent Application No. 10-2021-0110477, filed on Aug. 20, 2021, the disclosure of which is incorporated herein by reference in its entirety.

BACKGROUND

1. Field of the Invention

The present disclosure relates to a braking control device and method for a motor driven vehicle, and more specifically, to a braking control device and method which estimates a wheel speed of a vehicle and controls an anti-lock brake system (ABS) using the estimated wheel speed.

2. Discussion of Related Art

Generally, brake systems for braking are installed in vehicles, and various types of systems have been recently proposed to obtain a stronger and more stable braking force.

As one example of a brake system, there is an anti-lock brake system (ABS) which prevents slipping of a wheel during braking, a brake traction control system (BTCS) which prevents slipping of a driving wheel when a vehicle suddenly lurches forward or accelerates rapidly, or an electronic stability control system (ESC) in which an ABS and traction control are combined to control a brake hydraulic pressure and maintain a stable driving state of a vehicle.

Among them, in the case of ABS technology, an ABS is designed to estimate a wheel speed based on a sensor and operate at a proper time point.

In a situation in which an abnormality of the wheel sensor which estimates the wheel speed occurs, there is a problem that the ABS cannot operate normally.

SUMMARY OF THE INVENTION

The present disclosure is directed to providing a braking control device for a motor driven vehicle capable of estimating a wheel speed using not only a wheel sensor but also a resolver signal of a motor.

The present disclosure is also directed to providing a braking control device for a motor driven vehicle capable of determining a failure of a wheel sensor, estimating a wheel speed using a resolver signal of a motor even when the wheel sensor fails, and operating an anti-lock brake system (ABS) using the determination and the estimated wheel speed.

Objectives of the present disclosure are not limited to the objectives described above, and other objectives which are not described will be clearly understood by those skilled in the art through the following description.

According to one aspect of the present disclosure, there is provided a braking control device for a motor driven vehicle, the braking control device including a wheel rotation speed sensing part which is disposed on each wheel of the vehicle and detects a detection speed of wheel rotation of the vehicle, a wheel rotation speed estimation part which detects a resolver value of a motor and estimates an estimation speed of wheel rotation using the detected resolver value, a sensor determination part which determines whether the wheel rotation speed sensing part is abnormal using the detection speed of wheel rotation and the estimation speed of wheel rotation, and a wheel rotation speed determination part which determines the estimated estimation speed of wheel rotation to be a wheel rotation speed of the vehicle when the wheel rotation speed sensing part is abnormal.

The sensor determination part may determine whether the wheel rotation speed sensing part is abnormal according to a ratio between the detection speed of wheel rotation detected by the wheel rotation speed sensing part and a wheel rotation speed estimation value estimated by the wheel rotation speed estimation part and a preset ratio.

The wheel rotation speed estimation part may estimate a wheel rotation speed estimation value using a value obtained by multiplying the rotation speed of the motor and a wheel variable.

The wheel variable may be calculated using an equation $$G_{rpm2kph} = \frac{2\pi \times (WheelRadius) \times 60}{GearRatio \times 1000}$$

wherein G denotes a wheel variable, WheelRadius denotes a diameter of wheel including a car wheel, and GearRatio denotes a gear ratio.

The sensor determination part may determine that the wheel rotation speed sensing part is abnormal when the number of abnormalities of the wheel rotation speed sensing part is accumulated using the detected detection speed of wheel rotation and the estimation speed of wheel rotation calculated using a resolver of the motor and the number of abnormalities of the wheel rotation speed sensing part is greater than a preset accumulation number.

When an anti-lock brake system (ABS) operates, and it is determined that the wheel rotation speed sensing part is normal, the wheel rotation speed determination part may apply a wheel rotation speed detected using a conventional wheel sensor as a wheel rotation speed when the ABS operates.

According to another aspect of the present disclosure, there is provided a braking control method of a motor driven vehicle, the braking control method including detecting, by a wheel rotation speed sensing part disposed on each wheel of a vehicle, a detection speed of wheel rotation of the vehicle, estimating, by a wheel rotation speed estimation part disposed at a motor, an estimation speed of wheel rotation speed by detecting a resolver value of the motor and using the detected resolver value of the motor, determining, by a sensor determination part, whether the wheel rotation speed sensing part is abnormal using the detection speed of wheel rotation and the estimation speed of wheel rotation, and determining, by the wheel rotation speed determination part, the estimated estimation speed of wheel rotation to be a wheel rotation speed of the vehicle when it is determined that the wheel rotation speed sensing part is abnormal in the determining of whether the wheel rotation speed sensing part is abnormal.

The determining of whether the sensing part is abnormal may include determining whether the wheel rotation speed sensing part is abnormal according to a ratio between the detection speed of wheel rotation detected by the wheel rotation speed sensing part and the wheel rotation speed estimation value estimated by the wheel rotation speed estimation part and a preset ratio.

The estimating of the wheel rotation speed may include estimating a wheel rotation speed estimation value using a value obtained by multiplying the rotation speed of the motor and a wheel variable.

The wheel variable may be calculated using an equation $$G_{rpm2kph} = \frac{2\pi \times (WheelRadius) \times 60}{GearRatio \times 1000}$$

wherein G denotes a wheel variable, WheelRadius denotes a diameter of a wheel including a car wheel, and GearRatio denotes a gear ratio.

The determining of whether the sensing part is abnormal may include accumulating the numbers of abnormalities of the wheel rotation speed sensing part using the detected detection speed of wheel rotation and the estimation speed of wheel rotation calculated using a resolver of the motor; and The determining of whether the wheel rotation speed sensing part is abnormal may include accumulating the number of abnormalities of the wheel rotation speed sensing part using the detected detection speed of wheel rotation and the estimation speed of wheel rotation calculated using a resolver of the motor and determining that the wheel rotation speed sensing part is abnormal when the accumulated number of abnormalities of the wheel rotation speed sensing part is greater than a preset accumulation number.

The determining of the estimated estimation speed of wheel rotation to be the wheel rotation speed of the vehicle may include, when an anti-lock brake system (ABS) operates, and it is determined that the wheel rotation speed sensing part is normal, applying a wheel rotation speed of the wheel detected using a conventional wheel sensor as a wheel rotation speed when the ABS operates.

BRIEF DESCRIPTION OF THE DRAWINGS

The above and other objects, features and advantages of the present disclosure will become more apparent to those of ordinary skill in the art by describing exemplary embodiments thereof in detail with reference to the accompanying drawings, in which.

DETAILED DESCRIPTION OF EXEMPLARY EMBODIMENTS

Advantages and features of the present disclosure and methods of achieving the same will be clear with reference to the accompanying drawings and the following detailed embodiments. However, the present disclosure is not limited to the embodiments to be disclosed below but may be implemented in various different forms, the embodiments are provided in order to fully explain the present disclosure and fully explain the scope of the present disclosure for those skilled in the art, and the scope of the present disclosure is defined by the appended claims. Meanwhile, the terms used herein are provided to describe embodiments of the present disclosure and not for purposes of limitation. In the specification, unless the context clearly indicates otherwise, the singular forms include the plural forms. The terms "comprise" or "comprising" used in the specification specify some stated components, steps, operations and/or elements but do not preclude the presence or addition of one or more other components, steps, operations and/or elements.

Figure 1:
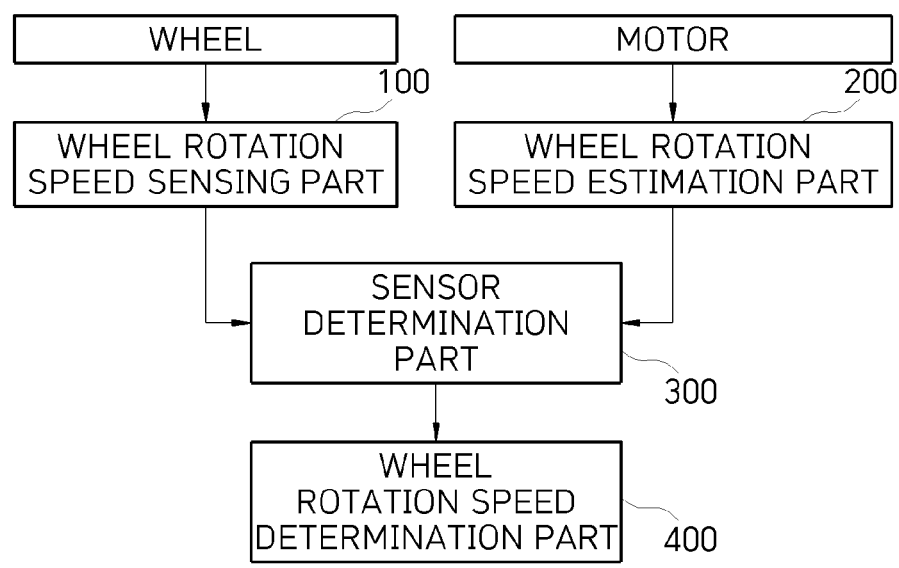
FIG. 1 is a block diagram for describing a braking control device for a motor driven vehicle according to one embodiment of the present disclosure.

FIG. 1 is a block diagram for describing a braking control device for a motor driven vehicle according to one embodiment of the present disclosure.

As illustrated in FIG. 1, the braking control device for a motor driven vehicle according to one embodiment of the present disclosure includes a wheel rotation speed sensing part 100, a wheel rotation speed estimation part 200, a sensor determination part 300, and a wheel rotation speed determination part 400.

The wheel rotation speed sensing part 100, which may be a wheel sensor, is provided on each wheel of the vehicle and detects a detection speed of wheel rotation of the vehicle.

The wheel rotation speed estimation part 200 detects a rotation speed of a motor which supplies driving power of an electric vehicle using a resolver and estimates an estimation speed of wheel rotation using the detected rotation speed of the motor. The wheel rotation speed estimation part 200 estimates a wheel rotation speed estimation value using a value obtained by multiplying a rotation speed of the motor and a wheel variable.

In this case, the wheel variable is expressed as in [Equation 1] below.

$$G_{rpm2kph} = \frac{2\pi \times (WheelRadius) \times 60}{GearRatio \times 1000} \quad \text{[Equation 1]}$$

Here, G denotes a wheel variable, WheelRadius denotes a diameter of a wheel including a car wheel, and GearRatio denotes a gear ratio.

Figure 2:
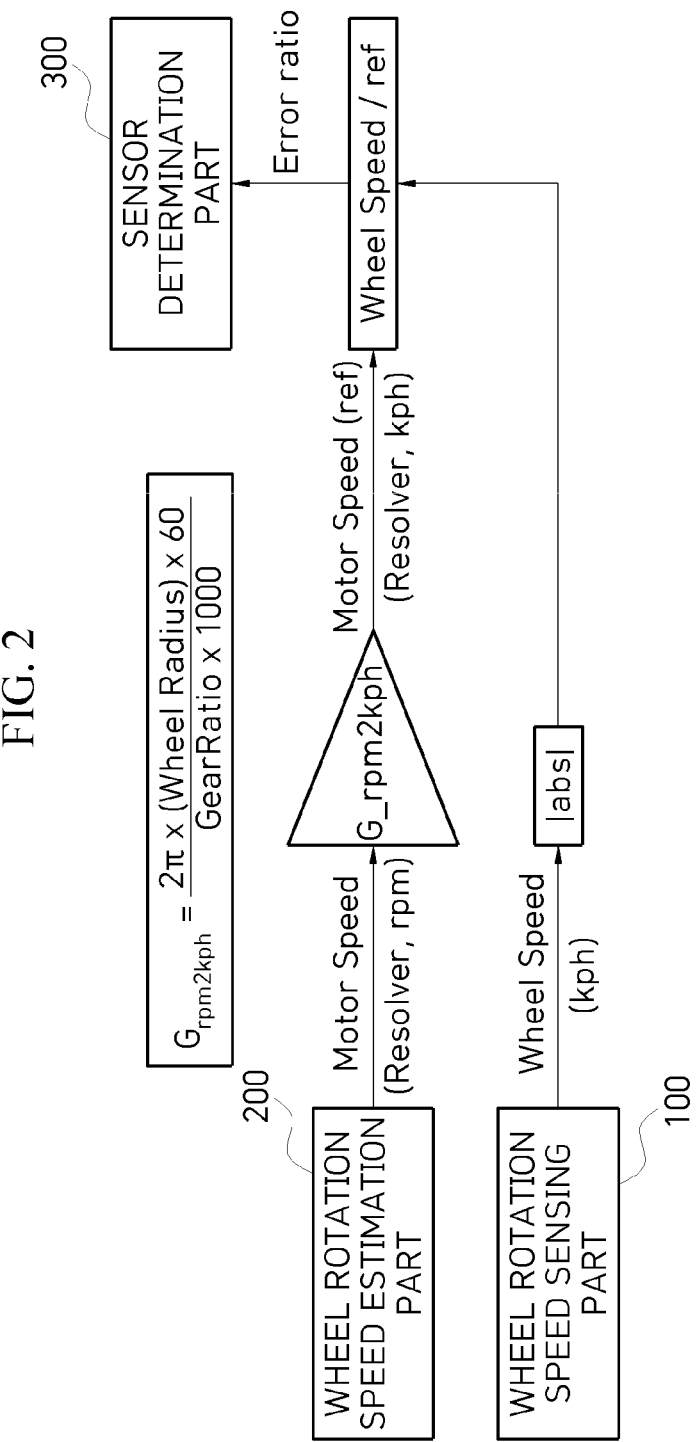
FIG. 2 is a reference view for describing operations of a sensing determination part according to one embodiment of the present disclosure.

As illustrated in FIG. 2, the sensor determination part 300 determines whether the wheel rotation speed sensing part 100 is abnormal using the detection speed of wheel rotation and the estimation speed of wheel rotation. The sensor determination part 300 determines whether the wheel rotation speed sensing part 100 is abnormal according to a ratio between the detection speed of wheel rotation detected by the wheel rotation speed sensing part 100 and the wheel rotation speed estimation value estimated by the wheel rotation speed estimation part and a preset ratio. In this embodiment, if the ratio is greater than or less than the preset ratio, it is determined as abnormal.

The sensor determination part 300 accumulates the number of abnormalities of the wheel rotation speed sensing part 100 using the detected detection speed of wheel rotation and the estimation speed of wheel rotation calculated using the resolver of the motor and determines that the wheel sensor is abnormal when the accumulated number of abnormalities of the wheel rotation speed sensing part 100 becomes greater than a preset accumulation number.

When the wheel rotation speed sensing part 100 is abnormal, the wheel rotation speed determination part 400 determines the estimated estimation speed of wheel rotation to be a wheel rotation speed of the vehicle, and when the wheel sensor is normal, the wheel rotation speed determination part 400 may determine the detection speed of wheel rotation detected using the wheel sensor as a wheel rotation speed of the vehicle and apply the detected detection speed of wheel rotation when an anti-lock brake system (ABS) operates.

According to one embodiment of the present disclosure, there is an effect of estimating a rotation speed of the wheel using a speed of the motor of the electric vehicle and applying the estimated rotation speed of the wheel to an ABS even when an abnormality occurs in the wheel speed detection sensor for detecting a rotation speed of the wheel, which is needed to perform an ABS function.

Figure 3:
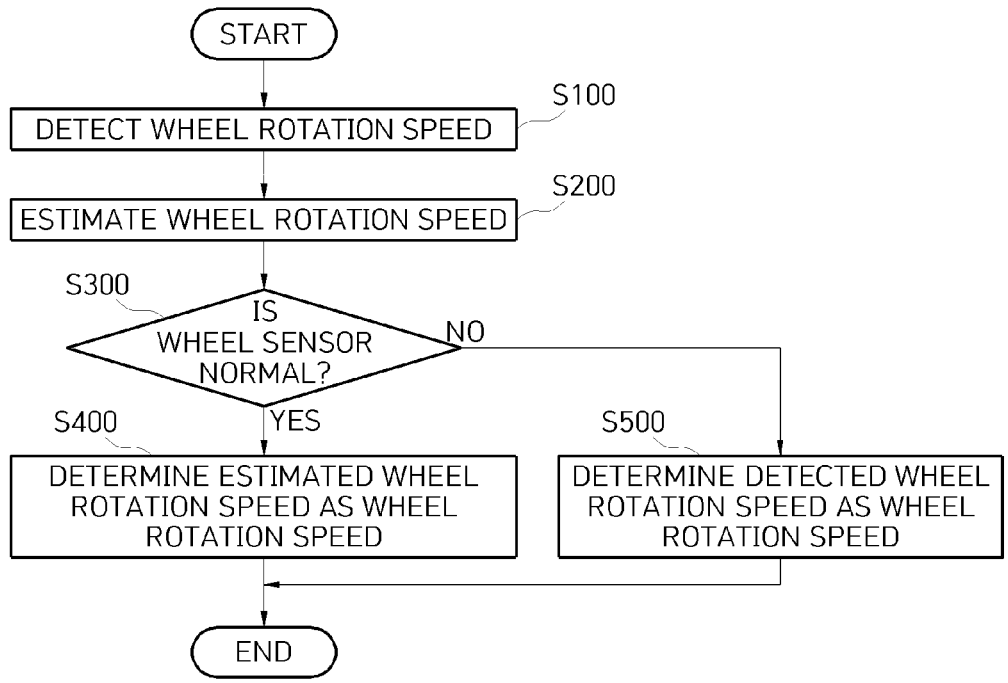
FIG. 3 is a flowchart for describing a braking control method of a motor driven vehicle according to one embodiment of the present disclosure.

Hereafter, a braking control method of a motor driven vehicle according to one embodiment of the present disclosure will be described with reference to FIG. 3.

First, the wheel rotation speed sensing part 100 provided on each wheel of the vehicle detects a detection speed of wheel rotation of the vehicle (S100).

In addition, the wheel rotation speed estimation part 200 provided at the motor detects a rotation speed of the motor which supplies driving power of the electric vehicle using the resolver and estimates an estimation speed of wheel rotation using the detected rotation speed of the motor (S200). In the operation (S200) of estimating the wheel rotation speed, a wheel rotation speed estimation value is estimated using a value obtained by multiplying the rotation speed of the motor detected by the motor and a wheel variable.

In this case, the wheel variable is expressed as in [Equation 1] below.

$$G_{rpm2kph} = \frac{2\pi \times (WheelRadius) \times 60}{GearRatio \times 1000} \quad \text{[Equation 1]}$$

Here, G denotes a wheel variable, WheelRadius denotes a diameter of a wheel including a car wheel, and GearRatio denotes a gear ratio.

The sensor determination part 300 determines whether the wheel rotation speed sensing part 100 is abnormal using the detection speed of wheel rotation and the estimation speed of wheel rotation (S300). In the operation (S300) of determining whether the sensing part is abnormal, whether the wheel rotation speed sensing part 100 is abnormal may be determined according to a ratio between the detection speed of wheel rotation detected by the wheel rotation speed sensing part 100 and the wheel rotation speed estimation value estimated by the wheel rotation speed estimation part 200 and a preset ratio.

Figure 4:
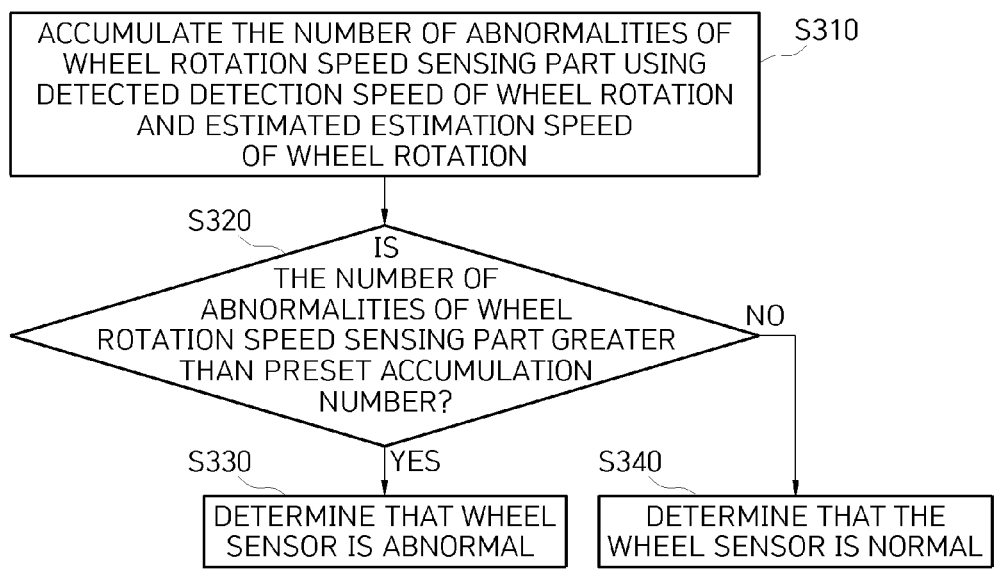
FIG. 4 is a flowchart for describing a detailed process of an operation of determining a wheel sensor abnormality illustrated in FIG. 3.

In the operation (S300) of determining whether the sensing part is abnormal, as illustrated in FIG. 4, the number of abnormalities of the wheel rotation speed sensing part 100 is accumulated using the detected detection speed of wheel rotation and the estimation speed of wheel rotation calculated using the rotation speed of the motor (S310), and when the accumulated number of abnormalities of the wheel rotation speed sensing part 100 is greater than a preset accumulation number (YES), it is determined that the wheel sensor is abnormal (S320).

When the accumulated number of abnormalities of the wheel rotation speed sensing part 100 is not greater than the preset accumulation number (NO), it is determined than the wheel sensor is normal (S340).

In the determination operation (S300), when the wheel rotation speed sensing part 100 is abnormal (YES), the wheel rotation speed determination part 400 determines the estimated estimation speed of wheel rotation to be a wheel rotation speed of the vehicle (S400).

Conversely, in the determination operation (S300), when the wheel rotation speed sensing part 100 is normal (NO), the wheel rotation speed determination part 400 determines the detected detection speed of wheel rotation to be a wheel rotation speed of the vehicle (S500).

The operations (S400 and S500) of determining the wheel rotation speed of the vehicle are applied when the ABS operates using the detection speed of wheel rotation detected by the wheel sensor or using the estimation speed of wheel rotation estimated by the wheel rotation estimation part according to a result during ABS operation.

According to one embodiment of the present disclosure, there is an effect of estimating a rotation speed of the wheel using a speed of the motor of the electric vehicle and applying the estimated rotation speed of the wheel to an ABS even when an abnormality occurs in the wheel speed detection sensor for detecting a rotation speed of the wheel, which is needed to perform an ABS function.

According to one embodiment of the present disclosure, there is an effect of estimating a rotation speed of a wheel using a speed of a motor of an electric vehicle and applying the estimated rotation speed of the wheel to an anti-lock brake system (ABS) even when an abnormality occurs in a wheel speed detection sensor for detecting a rotation speed of the wheel, which is needed to perform an ABS function.

While the configuration of the present disclosure has been described in detail with reference to the accompanying drawings, this is only an example, and various changes and modifications may be made by those skilled in the art within the range of the technical spirit of the present disclosure. Therefore, the scope of the present disclosure should not be limited by the above-described embodiments and should be defined by the appended claims.

Each step included in the method described above may be implemented as a software module, a hardware module, or a combination thereof, which is executed by a computing device.

Also, an element for performing each step may be respectively implemented as first to two operational logics of a processor.

The devices, apparatuses, units, modules, and components described herein, e.g., the wheel rotation speed estimation part 200, the sensor determination part 300, and the wheel rotation speed determination part 400, with respect to FIGS. 1-4 are implemented by hardware components. Examples of hardware components that may be used to perform the operations described in this application where appropriate include controllers, sensors, generators, drivers, memories, comparators, arithmetic logic units, adders, subtractors, multipliers, dividers, integrators, and any other electronic components configured to perform the operations described in this application. In other examples, one or more of the hardware components that perform the operations described in this application are implemented by computing hardware, for example, by one or more processors or computers. A processor or computer may be implemented by one or more processing elements, such as an array of logic gates, a controller and an arithmetic logic unit, a digital signal processor, a microcomputer, a programmable logic controller, a field-programmable gate array, a programmable logic array, a microprocessor, or any other device or combination of devices that is configured to respond to and execute instructions in a defined manner to achieve a desired result. In one example, a processor or computer includes, or is connected to, one or more memories storing instructions or software that are executed by the processor or computer. Hardware components implemented by a processor or computer may execute instructions or software, such as an operating system (OS) and one or more software applications that run on the OS, to perform the operations described in this application. The hardware components may also access, manipulate, process, create, and store data in response to execution of the instructions or software. For simplicity, the singular term "processor" or "computer" may be used in the description of the examples described in this application, but in other examples multiple processors or computers may be used, or a processor or computer may include multiple processing elements, or multiple types of processing elements, or both. For example, a single hardware component or two or more hardware components may be implemented by a single processor, or two or more processors, or a processor and a controller. One or more hardware components may be implemented by one or more processors, or a processor and a controller, and one or more other hardware components may be implemented by one or more other processors, or another processor and another controller. One or more processors, or a processor and a controller, may implement a single hardware component, or two or more hardware components. A hardware component may have any one or more of different processing configurations, examples of which include a single processor, independent processors, parallel processors, single-instruction single-data (SISD) multiprocessing, single-instruction multiple-data (SIMD) multiprocessing, multiple-instruction single-data (MISD) multiprocessing, and multiple-instruction multiple-data (MIMD) multiprocessing.

The methods that perform the operations described in this application, and illustrated in FIGS. 1-4, are performed by computing hardware, for example, by one or more processors or computers, implemented as described above executing instructions or software to perform the operations described in this application that are performed by the methods. For example, a single operation or two or more operations may be performed by a single processor, or two or more processors, or a processor and a controller. One or more operations may be performed by one or more processors, or a processor and a controller, and one or more other operations may be performed by one or more other processors, or another processor and another controller, e.g., as respective operations of processor implemented methods. One or more processors, or a processor and a controller, may perform a single operation, or two or more operations.

Instructions or software to control computing hardware, for example, one or more processors or computers, to implement the hardware components and perform the methods as described above may be written as computer programs, code segments, instructions or any combination thereof, for individually or collectively instructing or configuring the one or more processors or computers to operate as a machine or special-purpose computer to perform the operations that be performed by the hardware components and the methods as described above. In one example, the instructions or software include machine code that is directly executed by the one or more processors or computers, such as machine code produced by a compiler. In another example, the instructions or software include higher-level code that is executed by the one or more processors or computers using an interpreter. The instructions or software may be written using any programming language based on the block diagrams and the flow charts illustrated in the drawings and the corresponding descriptions in the specification, which disclose algorithms for performing the operations that are performed by the hardware components and the methods as described above.

The instructions or software to control computing hardware, for example, one or more processors or computers, to implement the hardware components and perform the methods as described above, and any associated data, data files, and data structures, may be recorded, stored, or fixed in or on one or more non-transitory computer-readable storage media. Examples of a non-transitory computer-readable storage medium include read-only memory (ROM), random-access programmable read only memory (PROM), EEPROM, RAM, DRAM, SRAM, flash memory, non-volatile memory, CD-ROMs, CD-Rs, CD+Rs, CD-RWs, CD+RWs, DVD-ROMs, DVD-Rs, DVD+Rs, DVD-RWs, DVD+RWs, DVD-RAMs, BD-ROMs, BD-Rs, BD-R LTHs, BD-REs, blue-ray or optical disk storage, hard disk drive (HDD), solid state drive (SSD), flash memory, a card type memory such as multimedia card micro or a card (for example, secure digital (SD) or extreme digital (XD)), magnetic tapes, floppy disks, magneto-optical data storage devices, optical data storage devices, hard disks, solid-state disks, and any other device that is configured to store the instructions or software and any associated data, data files, and data structures in a non-transitory manner and provide the instructions or software and any associated data, data files, and data structures to one or more processors and computers so that the one or more processors and computers can execute the instructions. In one example, the instructions or software and any associated data, data files, and data structures are distributed over network-coupled computer systems so that the instructions and software and any associated data, data files, and data structures are stored, accessed, and executed in a distributed fashion by the one or more processors or computers.

While this disclosure includes specific examples, it will be apparent to one of ordinary skill in the art, after an understanding of the disclosure of this application, that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner, and/or replaced or supplemented by other components or their equivalents.

Therefore, the scope of the disclosure is defined not by the detailed description, but by the claims and their equivalents, and all variations within the scope of the claims and their equivalents are to be construed as being included in the disclosure.

What is claimed is:

1. A braking control device for a motor driven vehicle, comprising:
   a wheel rotation speed sensing part disposed on each wheel of the vehicle and configured to detect a detection speed of wheel rotation of the vehicle;
   a wheel rotation speed estimation part configured to detect a rotation speed of the motor for supplying driving power of an electric vehicle and to estimate an estimation speed of wheel rotation using the detected rotation speed of the motor;
   a sensor determination part configured to determine whether the wheel rotation speed sensing part is abnormal using the detection speed of wheel rotation and the estimation speed of wheel rotation; and a wheel rotation speed determination part configured to determine the estimated estimation speed of wheel rotation to be a wheel rotation speed of the vehicle when the wheel rotation speed sensing part is abnormal, wherein the wheel rotation speed estimation part estimates a wheel rotation speed estimation value using a value obtained by multiplying the rotation speed of the motor and a wheel variable; and wherein the wheel variable is calculated using an equation:

$$G_{rpm2kph}=2\pi\times(\text{WheelRadius})\times 60/\text{GearRatio}\times 1000$$
wherein 'G' denotes a wheel variable, 'WheelRadius' denotes a diameter of a wheel including a car wheel, and 'GearRatio' denotes a gear ratio.

2. The braking control device of claim 1, wherein the sensor determination part determines whether the wheel rotation speed sensing part is abnormal according to a ratio between the detection speed of wheel rotation detected by the wheel rotation speed sensing part and a wheel rotation speed estimation value estimated by the wheel rotation speed estimation part and a preset ratio.

3. The braking control device of claim 1, wherein the sensor determination part determines that the wheel rotation speed sensing part is abnormal when the number of abnormalities of the wheel rotation speed sensing part, which is accumulated using the detected detection speed of wheel rotation and the estimation speed of wheel rotation calculated using the rotation speed of the motor, is greater than a preset accumulation number.

4. The braking control device of claim 1, wherein, when an anti-lock brake system (ABS) operates and the wheel rotation speed sensing part is determined to be normal, the wheel rotation speed determination part applies a wheel rotation speed detected using a conventional wheel sensor as a wheel rotation speed when the ABS operates.

5. A braking control method of a motor driven vehicle, comprising:

detecting, by a wheel rotation speed sensing part disposed on each wheel of the vehicle, a detection speed of wheel rotation of the vehicle;

detecting, by a rotation speed estimation part, a rotation speed of a motor for supplying driving power of an electric vehicle and estimating an estimation speed of wheel rotation using the detected rotation speed of the motor;

determining, by a sensor determination part, whether the wheel rotation speed sensing part is abnormal using the detection speed of wheel rotation and the estimation speed of wheel rotation; and determining, by the wheel rotation speed determination part, the estimated estimation speed of wheel rotation to be a wheel rotation speed of the vehicle when the wheel rotation speed sensing part is determined to be abnormal in the determining of whether the wheel rotation speed sensing part is abnormal, wherein the estimating of the wheel rotation speed includes estimating a wheel rotation speed estimation value using a value obtained by multiplying the rotation speed of the motor and a wheel variable, and wherein the wheel variable is calculated using an equation:

$$G_{rpm2kph}=2\pi\times(\text{WheelRadius})\times 60/\text{GearRatio}\times 1000$$
wherein 'G' denotes a wheel variable, 'WheelRadius' denotes a diameter of a wheel including a car wheel, and 'GearRatio' denotes a gear ratio.

6. The braking control method of claim 5, wherein the determining of whether the sensing part is abnormal includes determining whether the wheel rotation speed sensing part is abnormal according to a ratio between the detection speed of wheel rotation detected by the wheel rotation speed sensing part and a wheel rotation speed estimation value estimated by the wheel rotation speed estimation part and a preset ratio.

7. The braking control method of claim 5, wherein the determining of whether the sensing part is abnormal includes:

accumulating the number of abnormalities of the wheel rotation speed sensing part using the detected detection speed of wheel rotation and the estimation speed of wheel rotation calculated using a resolver of the motor; and determining that the wheel rotation speed sensing part is abnormal when the accumulated number of abnormalities of the wheel rotation speed sensing part is greater than a preset accumulation number.

8. The braking control method of claim 5, wherein the determining of the estimated estimation speed of wheel rotation to be the wheel rotation speed of the vehicle includes, when an anti-lock brake system (ABS) operates, and the wheel rotation speed sensing part is determined to be normal, applying a wheel rotation speed of the wheel detected using a conventional wheel sensor as a wheel rotation speed.

\* \* \* \* \*